Oct. 5, 1926. 1,601,853
R. E. CLIFFORD ET AL
GARDEN TRACTOR
Filed Feb. 1, 1922  2 Sheets-Sheet 1
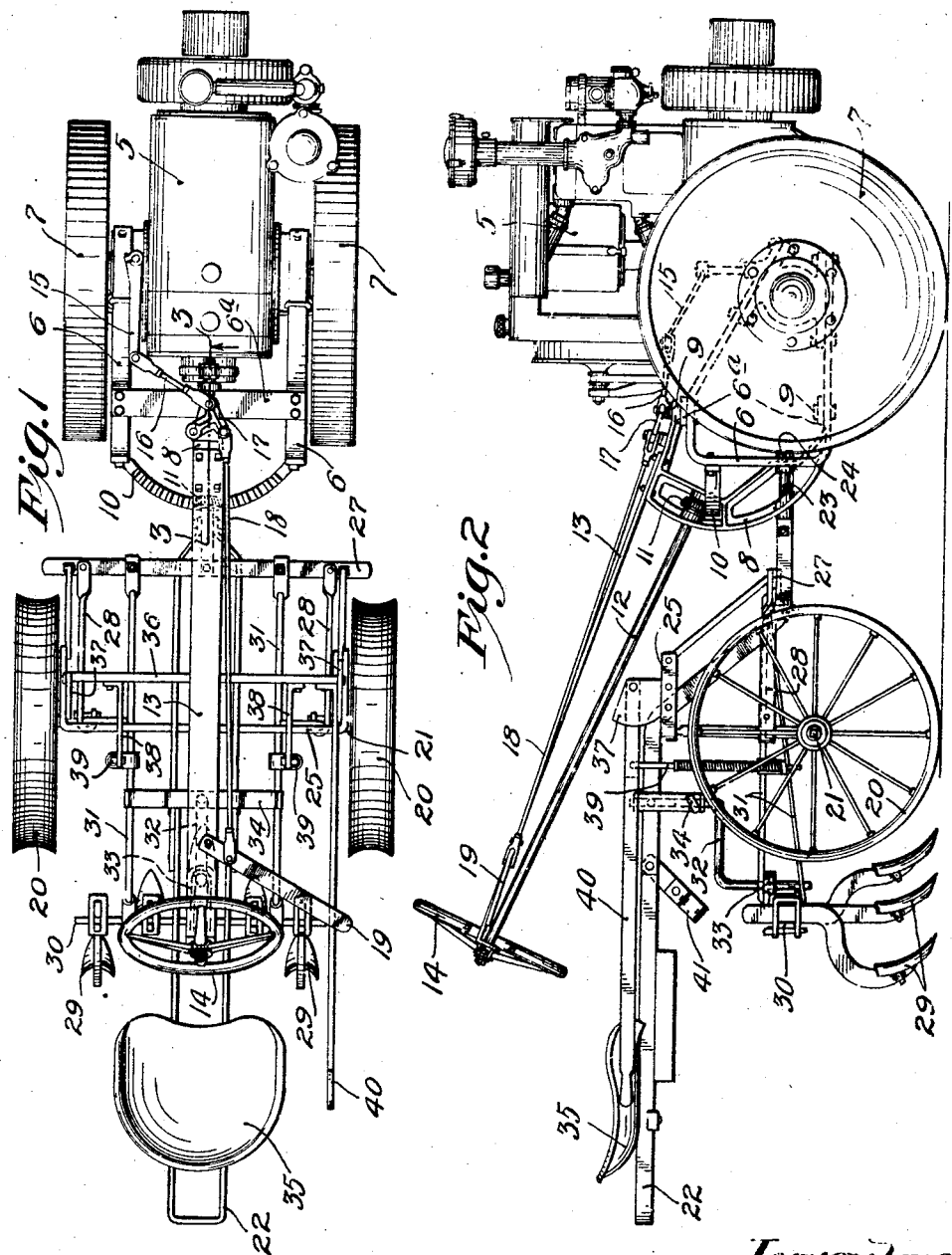
Inventors
Ralph E. Clifford
John R. Ritchie
By their Attorneys
Michael & Kilgore

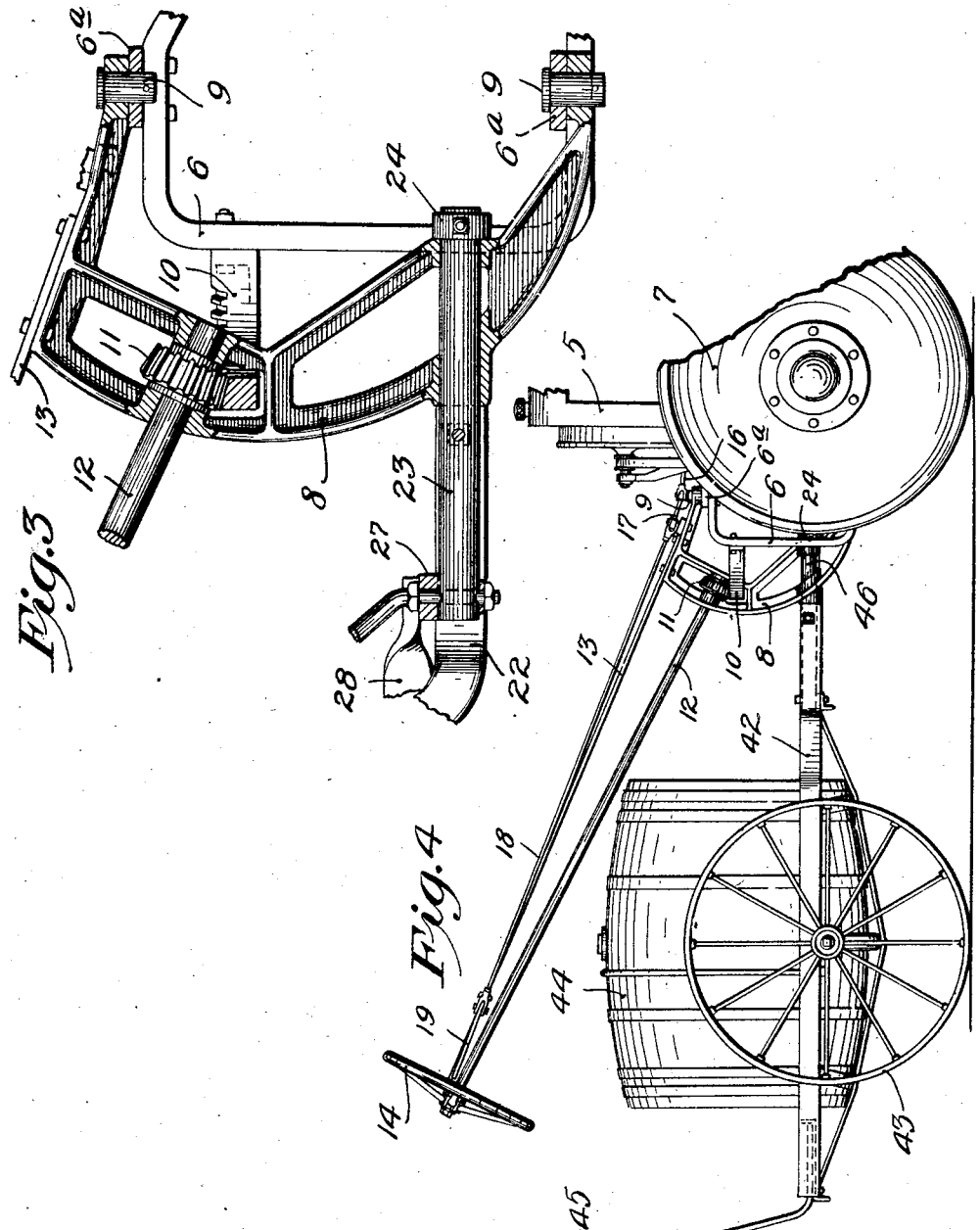

Patented Oct. 5, 1926.

1,601,853

UNITED STATES PATENT OFFICE.

RALPH E. CLIFFORD AND JOHN R. RITCHIE, OF MINNEAPOLIS, MINNESOTA, ASSIGNORS, BY MESNE ASSIGNMENTS, TO SAID CLIFFORD.

GARDEN TRACTOR.

Application filed February 1, 1922. Serial No. 533,321.

Particularly, our invention relates to small size tractors of the type frequently designated as garden tractors, but which, nevertheless, are capable of a very wide range of utility for agriculture or similar purposes.

Generally stated, the invention consists of the novel devices, combinations of devices and arrangement of parts hereinafter described and defined in the claim.

The tractor comprises two co-operative but quite independent units, to wit: a two-wheel power unit including the engine, and an operating unit, meaning thereby a truck or implement that will perform some kind of work such as plowing, cultivating or carrying a load and preferably also the operator's seat. Both the power unit and the operating unit may take various different forms so far as the broad idea of the invention is concerned.

As illustrated in the drawings and advisably, the power unit is of the character disclosed and claimed in the application of Paul B. Ford, S. N. 435,702, filed January 7, 1921, and entitled "Tractors". Several forms of the operating unit are illustrated in the drawings, one thereof being a cultivator, which in particular is brought into a new and important co-operative relation to the power unit and to steering and controlling mechanism which constitutes a part of the power unit but is operative from the operator's seat on the operating unit, from which latter the cultivating tools may be manipulated and laterally shifted independently of the travel of the operating unit.

In the accompanying drawings, which illustrate the invention, like characters indicate like parts throughout the several views.

Referring to the drawings:—

Fig. 1 is a plan view showing a complete tractor embodying our invention;

Fig. 2 is a side elevation of the same;

Fig. 3 is an enlarged vertical section taken approximately on the line 3—3 of Fig. 1, some parts being broken away and some parts being removed; and Fig. 4 is a side elevation of the tractor but involving a different operating unit from that shown in Figs. 1 and 2.

Describing first the construction illustrated in Figs. 1, 2 and 3, the numeral 5 indicates as an entirety an internal combustion engine rigidly mounted on a truck frame 6 carried by traction wheels 7, said engine having suitable driving connections to said traction wheels, not necessary for the purposes of this case to specifically consider but which may be assumed to be such as described in the application of Paul B. Ford above identified. It may, however, be here stated that said engine is located with its center of gravity so far forward of the axis of the wheels 7 that when the power unit is uncoupled from the operating unit, said power unit will tend to tip forward, or, in other words, to lift upward its rear portions.

The numeral 8 indicates a vertically extended yoke, preferably a cast structure, the upper and lower arms of which, by vertically aligned pivot pins 9, are pivotally connected to the central rear portion of the truck frame 6, being as shown thus directly pivoted to vertically spaced transversely extended rear bars 6ᵃ of said truck frame. The said yoke 8 is thus mounted for horizontal swinging movements transversely of the tractor.

The numeral 10 indicates a toothed rack segment that is horizontally extended on the arc of a circle whose center is coincident with the aligned axes of the pivots 9. This rack segment is extended freely through an opening in the upper portion of the oscillatory yoke 8 and is engaged by a pinion 11 secured on the lower front end of an inclined steering post or shaft 12. The lower end of this post or shaft 12 is journaled in the upper portion of the oscillatory yoke 8 while the rear upper end thereof is journaled in the downturned end of an oblique supporting bar 13, the lower front end of which latter is bolted or otherwise rigidly secured to the top of said yoke so that said yoke, steering post and supporting bar are connected for common transverse oscillatory or swinging movement. At its extreme rear end, the steering post 12 is provided with a hand wheel 14, which, as will be hereinafter noted, is within easy reach of the operator's seat.

The clutch for connecting the engine transmission to the traction wheels 7 will be operated in the customary way by oscillatory movement of an arm 15 shown as connected by a link 16 to a double bell crank 17 pivoted on the top of the yoke 8 with the pivotal connection between said elements 16 and 17 always closely in the vicinity of the vertical axis of the yoke pivot 9, so that oscillatory movements of said yoke and parts carried thereby will neither set nor release the clutch. The bell crank 17 is connected by a rod 18 to a hand-operated lever 19 pivoted to the rear portion of the supporting bar 13 and located in the vicinity of the hand wheel 14 where it also may be readily reached from the operator's seat.

The operating unit illustrated in Figs. 1 and 2 is a two-wheel cultivator comprising laterally spaced wheels 20 journaled to axles 21 rigidly connected to the frame of said cultivator. The cultivator frame, as shown comprises a longitudinally extended frame member 22 formed by a flat metal bar bent double and having its prongs bolted or otherwise rigidly secured to a swivel rod 23. This swivel rod 23 extends longitudinally of the machine, projects forward from the cultivator truck and is extended through and swiveled in the yoke 8, being as shown provided at its front end with a stop collar 24 detachably bolted to said rod. The cultivator frame also comprises upper transverse frame bar 25, a lower front draft beam 27 and laterally spaced truss bars 28, all of which parts are rigidly connected together and to the main frame member 22. The cultivating tools 29 are shown as secured to a transverse beam 30, which, by parallel drawbars 31, is connected to the draft beam 27.

The numeral 32 indicates a tool-shifting crank the upturned end of which is journaled in a suitable bearing on the frame member 22 and the lower end of which depends loosely through a lug 33 on the tool bar or transverse beam 30. The numeral 34 indicates a foot lever that is intermediately rigidly secured to the upper end of the crank 32, and the depressed ends of which are within proper reach of the feet of the operator's seat 35, which latter is carried by the rear portion of the frame member 22.

The numeral 36 indicates a transverse bar, which, at its ends, is pivoted in bearing plates 37 rigidly secured on the frame bar 25. This bar 36 has rearwardly extended arms 38 that are connected by yielding links 39 to the drawbars 31. The numeral 40 indicates a lever that is rigidly secured to one end of the bar 36 and extends rearward within easy reach from the operator's seat 35. The numeral 41 indicates a hanger arm pivoted to the frame member 22 and engageable with the tool bar 30 to hold the tools 29 in elevated positions above the ground when out of use.

The tractor, as is evident, is adapted to be steered from the operator's seat by manipulation of the hand wheel 14 of the steering post 12 and the transmission clutch may be likewise controlled by manipulation of the lever 19. The swivel connection between the rod 23 and yoke 8 permits the front and rear wheels to adapt themselves to all irregularities in the ground or road. The yoke 8, of course, partakes of the horizontal oscillatory movements of the rear truck and, hence, always keeps the hand wheel 14 and lever 19 in constant relative position to the operator's seat. The said swivel connection between the rod 23 and yoke 8, however, resists all strains tending to tilt either the front or rear truck either forwardly or rearwardly and it forms the sole or only draft connection between the two trucks or units.

The preponderance of weight of the engine forward of the axes of the traction wheels 7 is such that, with the complete rig shown in Figs. 1 and 2, the operator may when off the seat, by taking hold of the rear end of the frame member 22 use the latter as a lever and easily lift the entire rear truck or unit, wheels, tools and all off from the ground, thereby, when desirable, turning the tractor rig either partly or completely around.

When the detachable collar 24 is removed, the swivel rod 23 may be withdrawn from the yoke 8, thereby disconnecting the rear truck or unit from the front truck or unit. When the harrow or operating unit is disconnected from the power unit, the yoke 8, steering post 12 and its supporting bar 13 remain operatively connected to and form a part of the said power unit, so that said power unit may be operated and controlled by a person walking and holding the hand wheel 14. When a different operating unit is then substituted for the cultivator and connected to the yoke, the same or original steering and operating connections are again available for use.

In Fig. 4, an operating unit or truck, such as used for spraying purposes, is shown as connected to the power unit and of the parts thereof the numeral 42 indicates the truck frame supported by wheels 43, carrying a tank 44 and operator's seat 45 and having the swivel rod 46 connected to the yoke 8 in the same manner as already described. In both of the arrangements described, the swivel rod 23 or 46, as the case may be, forms a part of a coupling reach for connecting the two power units.

The drawings of the above application have been taken from a commercial form of the improved tractor and illustrate a tractor rig, the operativeness and feasibility of which have been thoroughly demonstrated. The simplicity of the construction, moreover, makes the same of low manufacturing cost.

What we claim is:—

A traction rig comprising a two-wheeled engine-driven power unit including a body member, a yoke hinged to said body member for lateral swinging movements, a wheel-equipped operating unit having a forwardly extended drawbar rigidly connected thereto and which drawbar, at its front end, is directly connected to said yoke by a longitudinal swivel, a rearwardly extended steering post rotatively mounted at its front end directly in said yoke and having operative connections for steering the complete rig, and a supporting bar attached at its front end to said yoke, extended rearward and supporting the rear end of said steering post from said yoke, said steering post and its supporting bar being free from said working unit and its drawbar.

In testimony whereof we affix our signatures.

RALPH E. CLIFFORD.
JOHN R. RITCHIE.